(12) United States Patent
Bono et al.

(10) Patent No.: US 8,255,987 B2
(45) Date of Patent: Aug. 28, 2012

(54) COMMUNICATION ABUSE PREVENTION (75) Inventors: Joseph Andrew Bono, Kirkland, WA (US); Thomas R. Bauman, Redmond, WA (US); Jeffrey E. Steinbok, Redmond, WA (US); Eileen S. Hash, Kirkland, WA (US); Dan Wu, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 815 days.

(21) Appl. No.: 12/354,106

(22) Filed: Jan. 15, 2009

(65) Prior Publication Data
US 2010/0180333 A1   Jul. 15, 2010

(51) Int. Cl.
*G06F 15/16* (2006.01)
(52) U.S. Cl. .......... 726/14; 713/155; 713/168; 713/169; 713/170; 726/4; 726/11
(58) Field of Classification Search ............. 713/152, 713/154, 156; 726/11, 14, 4
See application file for complete search history.

(56) References Cited

U.S. PATENT DOCUMENTS

| 6,393,465 | B2 | 5/2002 | Leeds |
| 7,415,504 | B2 | 8/2008 | Schiavone et al. |
| 7,433,924 | B2 | 10/2008 | Malcolm |
| 2004/0024823 | A1 | 2/2004 | Del Monte |
| 2004/0181581 | A1 | 9/2004 | Kosco |
| 2005/0044154 | A1 | 2/2005 | Kaminski et al. |
| 2005/0193072 | A1 | 9/2005 | Chant et al. |
| 2005/0262209 | A1 | 11/2005 | Yu |
| 2009/0064329 | A1* | 3/2009 | Okumura et al. ............... 726/22 |

FOREIGN PATENT DOCUMENTS

| WO | 2004077710 A2 | 9/2004 |
| WO | 2007045049 A1 | 4/2007 |

OTHER PUBLICATIONS

Pogue, David "How to Block Cellphone Spam", retrieved at << http://pogue.blogs.nytimes.com/2008/06/12/how-to-block-cellphone-spam/ >>, "The New York Times", Jun. 12, 2008, pp. 3.
"Re: [Asrg] Solution Space (was Re: Textual Analysis is not the Solution)", retrieved at<< http://www.ietf.org/mail-archive/web/asrg/current/msg00037.html >>, Mar. 3, 2003, pp. 3.
Oskoboiny, Gerald, "Whitelist-based spam filtering", retrieved at << http://impressive.net/people/gerald/2000/12/spam-filtering.html >>, Oct. 23, 2008, pp. 3.
"Natural-Born Spam Killers", retrieved at<< http://pcworld.about.com/magazine/2105p113id109698.htm >>, Oct. 23, 2008, pp. 4.

* cited by examiner

*Primary Examiner* — Eleni Shiferaw
*Assistant Examiner* — Paul Callahan
(74) *Attorney, Agent, or Firm* — Wolfe-SMBC (57) ABSTRACT

Communication abuse prevention techniques are described. In an implementation, a reputation level for a communication is determined based on relation information for a sender and an intended recipient of the communication. A challenge is invoked that is to be completed by the sender before the communication is sent. The challenge is selected based on the reputation level for the communication.

18 Claims, 5 Drawing Sheets

COMMUNICATION ABUSE PREVENTION

BACKGROUND

Computer networks allow a user to communicate with other users. While a majority of communications are legitimate, some are unwanted, which are typically referred to as "spam." Although spam is often used to describe unwanted electronic mail (email) communication, spam may also refer to unwanted communications in other mediums. Example communication mediums may include but are not limited to web postings, private system messages, access requests, and instant messages. Spam may also refer to unwanted communication in other types of communication mediums including social network communications, public messaging, web comments, and so forth.

In a traditional implementation, spam is blocked based on a sender's email address. An email address may include a user name, a domain, and a top level domain. Thus, an email communication may be blocked if one or more of the user name, the domain, and the top level domain match an address which is associated with spam. Current spam blocking techniques may be inefficient, however, as spam is not blocked until an email address is reported as being associated with spam.

SUMMARY

Communication abuse prevention techniques are described. In an implementation, a reputation level for a communication is determined based on relation information for a sender and an intended recipient of the communication. A challenged is invoked that is to be completed by the sender before the communication is sent. The challenge is selected based on the reputation level for the communication.

In an implementation, one or more computer-readable media comprise instructions that are executable to generate an abuse prevention service. The abuse prevention service is operable to iterate determination of a reputation level for a communication based on information associated with a sender and an intended recipient of the communication. The abuse prevention service is also operable to inhibit access to the communication in response to a change in reputation level between two reputation level determinations that occur before the communication is accessed by the intended recipient.

In an implementation, one or more computer-readable media comprise instructions that are executable to check a reputation level for a communication with a specified reputation level designated by an intended recipient of the communication. The reputation level for the communication is based on relation information for a sender and the intended recipient of the communication. The instructions are further executable to invoke a challenge. When the sender and intended recipient do not have a preexisting relationship, the challenge is to be completed by the sender before the communication is made accessible to the intended recipient. The challenge is selected according to the specified reputation level.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Communication networks allow users to communicate in an open manner, such as to allow a sender to send a communication to other members in the network. Although most communications are wanted, some communications are unwanted, which may detract from a user's experience.

Techniques are described which may be used to reduce communication abuse. In an implementation, an abuse prevention service may be used to determine a reputation level for a communication. The abuse prevention service may make the determination based on information associated with one or more of the sender, the recipient, the communication itself, and so forth. For example, the abuse prevention service may make the determination based on relation information that indicates whether the sender and the recipient have a relationship. When the sender and the recipient do have a relationship (e.g., the sender and recipient have previously communicated with each other), the communication may proceed. In contrast, a challenge (e.g., a human interaction proof (HIP) challenge) may be invoked based on the reputation level when the sender and recipient do not have a relationship. Thus, the sender may be asked to complete the challenge before the communication is sent. Upon successful completion of the challenge, the communication is sent. The communication may be blocked, isolated, or scanned for malware, when the challenge is not successfully completed.

In the following discussion, an example environment and systems are first described that are operable to perform one or more techniques that may be use to prevent communication abuse. Example procedures are then described that may be implemented using the example environment as well as other environments. Accordingly, implementation of the procedures is not limited to the environment and the environment is not limited to implementation of the procedures.

Example Environment

Figure 1:
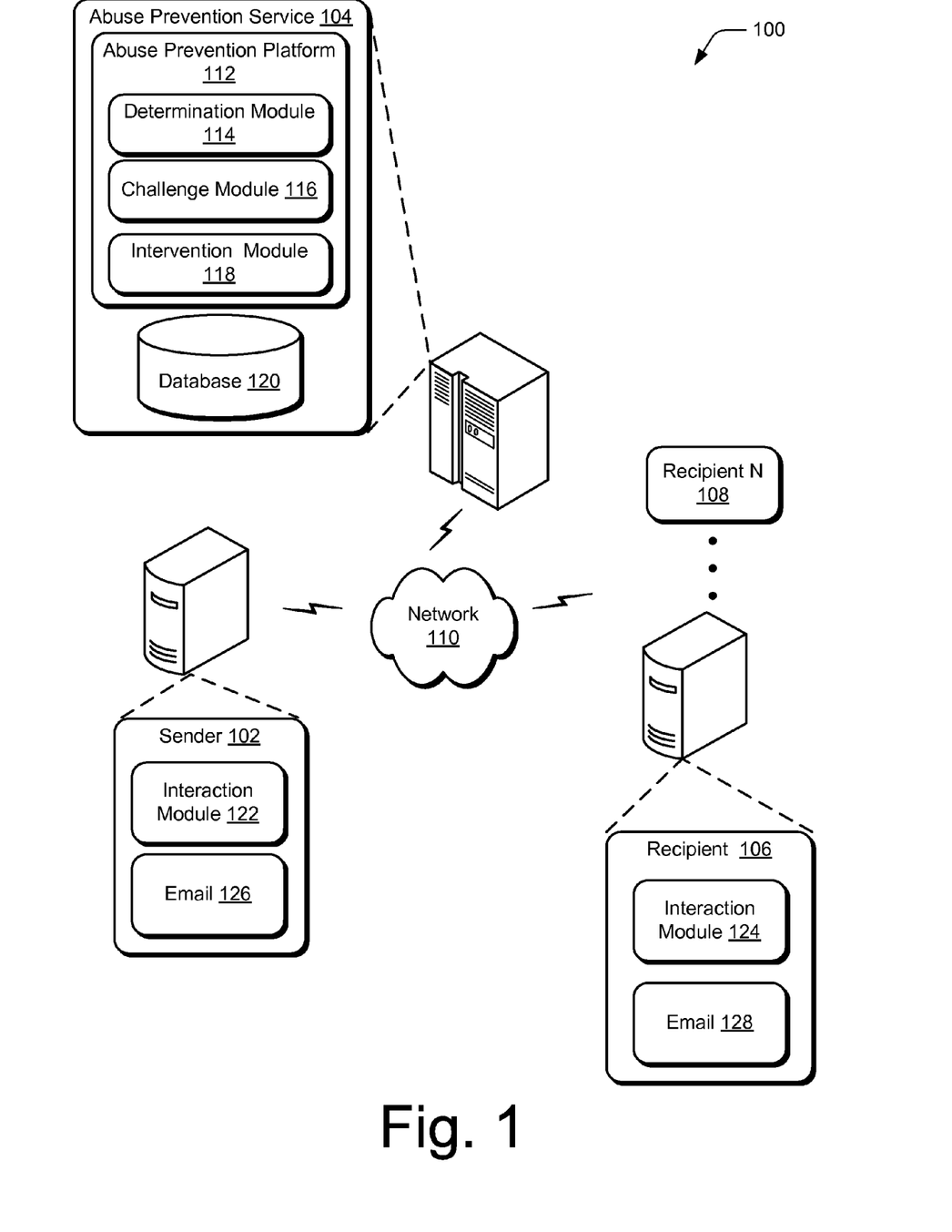
FIG. 1 is an illustration of an environment in an example implementation that is operable to perform communication abuse prevention techniques.

FIG. 1 is an illustration of an environment 100 in an example implementation that is operable to employ communication abuse prevention techniques. The illustrated environment 100 includes a sender 102, an abuse prevention service 104, and recipients 106, 108 communicatively coupled by a network 110. In the following discussion, the sender 102, the abuse prevention service 104 and the recipients 106, 108 may be representative of one or more entities. Thus, although the abuse prevention service 104 is illustrated as being provided by a single server, multiple servers may be used to provide the abuse prevention service. Furthermore, while recipients 106, 108 are discussed, the recipients may be intended recipients. This is to say, a communication may be attempted but not be completed with the recipients 106, 108. For additional convenience in the discussion, at times users associated with the sender and recipients may be referred to as the sender or the recipient. The context of the discussion may be used to determine when a user of the sender or recipient is being referenced.

In one or more embodiments, the server providing the abuse prevention service 104 may perform other tasks. For example, the server may be a communication server that operates in accordance with MICROSOFT EXCHANGE SERVER (Microsoft, Corp., Redmond, Wash.). In another example, the server may host a social network website. A variety of other examples are also contemplated.

In the illustrated implementation, the abuse prevention service 104 is functionally described as provided by an abuse prevention platform 112. As further illustrated, and for clarity in the discussion, the abuse prevention platform 112 may include modules. For example, the abuse prevention platform 112 may include a determination module 114, a challenge module 116, and an intervention module 118.

The determination module 114 is representative of functionality to determine a reputation level for communications. In some embodiments, the determination module 114 may express the reputation level as one or more numerical values to facilitate analysis. The determination module 114 may base the reputation level on a variety of information that may come from a variety of sources. Additionally, the sources of information may use multiple types of communication mediums. Examples of communication mediums include but are not limited to web postings, private system messages, access requests, and instant messages. Other types of communication mediums may include social network communications, public messaging, web comments, and so on.

Information that serves as a basis of the reputation level may include relation information, reported activities, communication behavior, and so forth. Additionally, the information may be associated with one or more of the sender, the recipients, or the communication itself. For example, the determination module 114 may use information associated with the sender 102 and the recipients 106, 108 when assigning the reputation level to the communication.

Relation information may include information that tells something about a relationship between the sender and one or more of the recipients targeted by the communication. For example, relation information may include whether the recipient has previously communicated with the sender. In another example, relation information may include whether the sender and the recipient are on a "friends list" for a social networking site. A variety of other examples are also contemplated.

Relation information may also include information that indicates the sender and recipient do not have a relationship or that the recipient no longer wishes to have a relationship with the sender. For example, relation information may include whether the recipient has previously or is currently blocking communications. In another example, although the sender and the recipient have a previous relationship (e.g., exchanged communications), the recipient may override this relationship status. In this way, the recipient may selectively block communications from the sender or block each subsequent communication from the sender.

In some embodiments, the determination module 114 checks the determined reputation level with a specified reputation level for the recipient 106. For example, the determination module 114 may check the reputation level for the communication with a specified (e.g., preselected) reputation level for the recipients 106, 108. In this way, the determination module 114 may determine whether the reputation level for the communication meets or exceeds a reputation level that is specified for recipients 106, 108. In some embodiments, the determination module 114 may adaptively calculate a specified reputation level for the recipient 106. For example, the determination module 114 may heuristically calculate the specified reputation level in response to receipt of the communication.

The challenge module 116 is representative of functionality to invoke a challenge. The challenge may be invoked in response to a determination of a reputation level by the determination module 114. A challenge may include a test that is to be performed before a communication is sent. Example challenges may include human interaction proof (HIP) challenges. A HIP challenge may include a request to have a user answer a question that is designed to identify or otherwise indicate whether a human (as opposed to machine and/or software) is responding. In other instances, the challenge may be an activity that is performed based on the reputation level. For example, the challenge may include scanning the communication for malware.

In one or more embodiments, the challenge module 116 selects which particular challenge is to be invoked based on the reputation level for the communication. Thus, the challenge module 116 may scale which particular challenge is invoked based on the reputation level for the communication. For example, the challenge module 116 may select a human interaction proof (HIP) challenge that is relatively simple to complete when the communication has a good reputation level, e.g., is unlikely to be spam. The HIP challenge may be selected from a plurality of HIP challenges stored in the database 120. A challenge's relative simplicity or difficulty may be judged based on a prescreened success rate from a test group, an expected success rate, and so on. In contrast, the challenge module 116 may select a complex challenge or multiple challenges when the communication has a "poor" reputation level, e.g., communication is likely to be spam.

In some embodiments, the challenge module 116 may select the challenge based on a specified reputation level for the recipient 106 and/or for the network 110. For the purpose of example only and not limitation, the recipient may designate, via the specified reputation level, that a sender is either to have a preexisting relationship with the recipient or successfully complete a HIP challenge to communicate with the recipient 106. A wide variety of variations are also contemplated, further discussion of which may be found in relation to FIG. 2.

The intervention module 118 is representative of functionality to inhibit completion of a communication based on the reputation level for the communication. For example, the reputation level for a communication may change from one reputation level to another (i.e., between two reputation levels) when information for the sender changes in comparison to when the communication was sent. Accordingly, the intervention module 118 may inhibit access to the communication when the communication's reputation level changes. For example, the intervention module 118 may inhibit access by isolating the communication before the communication is opened by the recipient. Further discussion of the intervention module 118 may be found in FIG. 3.

As further illustrated, a database 120 may be associated with the abuse prevention service 104. The database 120 may store information related to the abuse prevention service 120.

The database 120 may store information (e.g., relation information, sender information, recipient information), challenges, and so on.

The sender 102 and the recipients 106, 108 may be configured in a variety of ways. As illustrated, the sender 102 and the recipient 106 each include an interaction module 122, 124 and an email application 126, 128. It is to be appreciated that the sender 102 and/or the recipients 106, 108 may individually lack an interaction module 122, 124 or have an interaction module that is configured in a different manner. For example, the recipient 106 may have an interaction module that is integrated with an email application 128. In addition, the sender 102 and/or the recipients 106, 108 may have additional communication applications that may incorporate functionality of the interaction module, share functionality of a common interaction module (e.g., via an operating system), and so forth.

The interaction modules 122, 124 are representative of functionality to interact with the abuse prevention service 104. The interaction modules 122, 124 may be used to manage settings, view information, and so on. In one or more implementations, the interaction module 122 may be used to present a challenge to be completed by the sender. For example, the interaction module 122 may present a challenge in a popup window.

Although the network 110 is illustrated as the Internet, the network 110 may assume a wide variety of configurations. For example, the network 110 may include a wide area network (WAN), a local area network (LAN), a wireless network, a public telephone network, an intranet, and so on. Further, although a single network 110 is shown, the network 110 may be configured to include multiple networks. For instance, the sender 102 and the recipients 106, 108 may be communicatively coupled via a local network while the sender 102 and the recipients 106, 108 each connect via the Internet to the abuse prevention service 104. A wide variety of other examples are also contemplated.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, and so on. The features of the communication abuse prevention techniques described herein are platform-independent, meaning that the techniques may be implemented on a variety of commercial computing platforms having a variety of processors.

Figure 2:
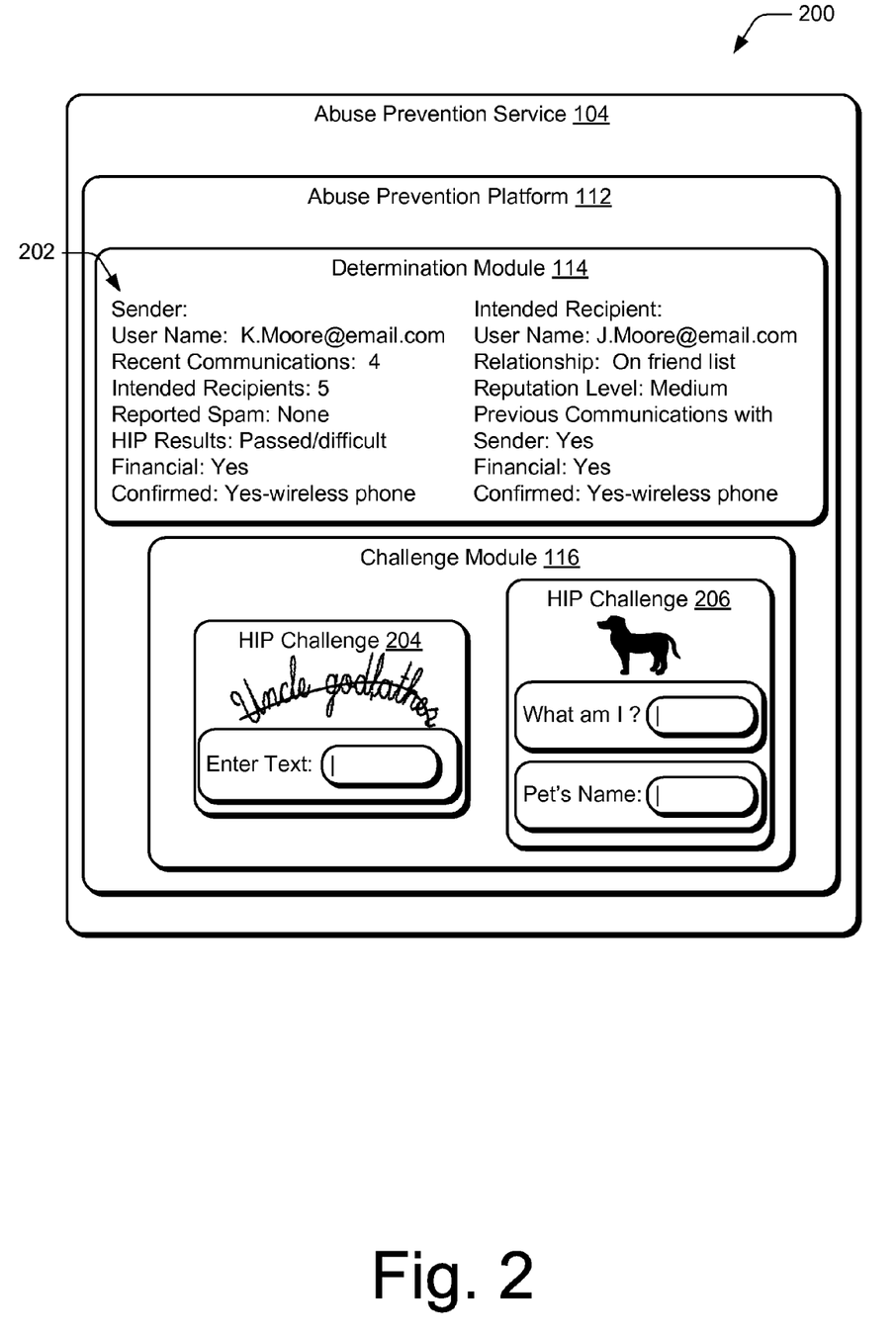
FIG. 2 is an illustration of a system in an example implementation in which an abuse prevention service of FIG. 1 is shown in greater detail.

FIG. 2 depicts a system 200 in an example implementation in which the determination module 114 and the challenge module 116 of FIG. 1 are shown in greater detail. By way of example, for discussion purposes alone and not limitation, presume an email is being sent between email accounts, k.moore@email.com to j.moore@email.com.

The determination module 114 may determine a reputation level for the communication (e.g., the email) based on a variety of information 202. The information 202 may be associated with the sender 102, the recipient 106, 108, and/or the communication itself. For example, the determination module 114 may check with an online service to obtain relation information for the sender 102 and recipient 106, 108. In another example, the determination module 114 may check how many recipients are to receive the communication, whether the sender 102 is a reported spammer, whether the sender 102 successfully completed previous challenges, and so on. Thus, the determination module 114 may use a wide variety of information to determine what reputation level is to be associated with the communication.

In some embodiments, the determination module 114 may implement a wide variety of techniques when making the reputation level determination. Example techniques include weighting the information, applying adaptive techniques (e.g., heuristic techniques), and so on.

The determination module 114 may make the determination by checking the reputation level for the communication with a specified reputation level set by one or more of the recipients 106, 108. In other instances, the determination module 114 may heuristically calculate the specified reputation level such as from recipient information, recipient related information, and so forth. In this way, the specified reputation level may be calculated from the recipient's previous communication habits.

In other instances, the specified reputation level may be set for the network 110. For example, a social networking website may have a specified reputation level such that the determination module 114 checks each posting against one or more reputation levels for the network 110.

In one or more embodiments, the determination module 114 may iterate reputation level determinations. The determination module 114 may repeat making determinations for a set period of time or until the occurrence of an event. For example, the determination module 114 may repeat the determination until the recipient accesses the communication.

In other embodiments, the determination module 114 may repeat the determination on the occurrence of an event. For example, the determination module 114 may perform the determination in response to a third party report that indicates the sender is a spammer, e.g., one who is associated with unwanted communications.

As discussed above, the determination module 114 may make the determination based on information from a wide variety of sources communicating via various mediums. In some embodiments, the information may be stored in the database 120. In addition, the determination module 114 may be configured to request information from the sender 102, the recipient 106, 108, various resources (e.g., third parties), and so on. For example, the determination module 114 may request that the sender supply additional information before the communication is sent.

The challenge module 116 may select which particular challenge is to be invoked based on the reputation level for the communication. In this way, the challenge module 116 may scale which particular challenge is invoked based on the reputation level for the communication. The challenge module 116 may select the particular challenge such that when the reputation level for the communication is poor (in comparison to a specified reputation level) the challenge may be more difficult than a challenge that is invoked when the communication has a good reputation. For example, as illustrated, the challenge module 116 may invoke HIP challenge 204 that asks a user to type some displayed text when the communication has a good reputation level. In contrast, the challenge module may invoke HIP challenge 206 that asks a series of questions when a communication has a poor reputation level. Thus, the challenge module 116 may invoke multiple challenges and/or more comparatively difficult challenges when the reputation level is poor (in comparison to a specified reputation level). In other instances, the challenge module 116 may block the communication, isolate the communication, delay delivery of the communication, flag the communication, or a combination of the foregoing. In other instances, the challenge module 116 may screen the communication for malware, e.g., viruses.

The challenge module 116 may invoke a challenge based on the reputation level determined by the determination module 114. The challenge module 114 may invoke the challenge at various times during the communication process. For instance, the challenge module 114 may send a HIP challenge to the sender 102 before the communication is sent. In another instance, the challenge module 116 may request that a user successfully complete a challenge or a previously delivered communication may be recalled.

Figure 3:
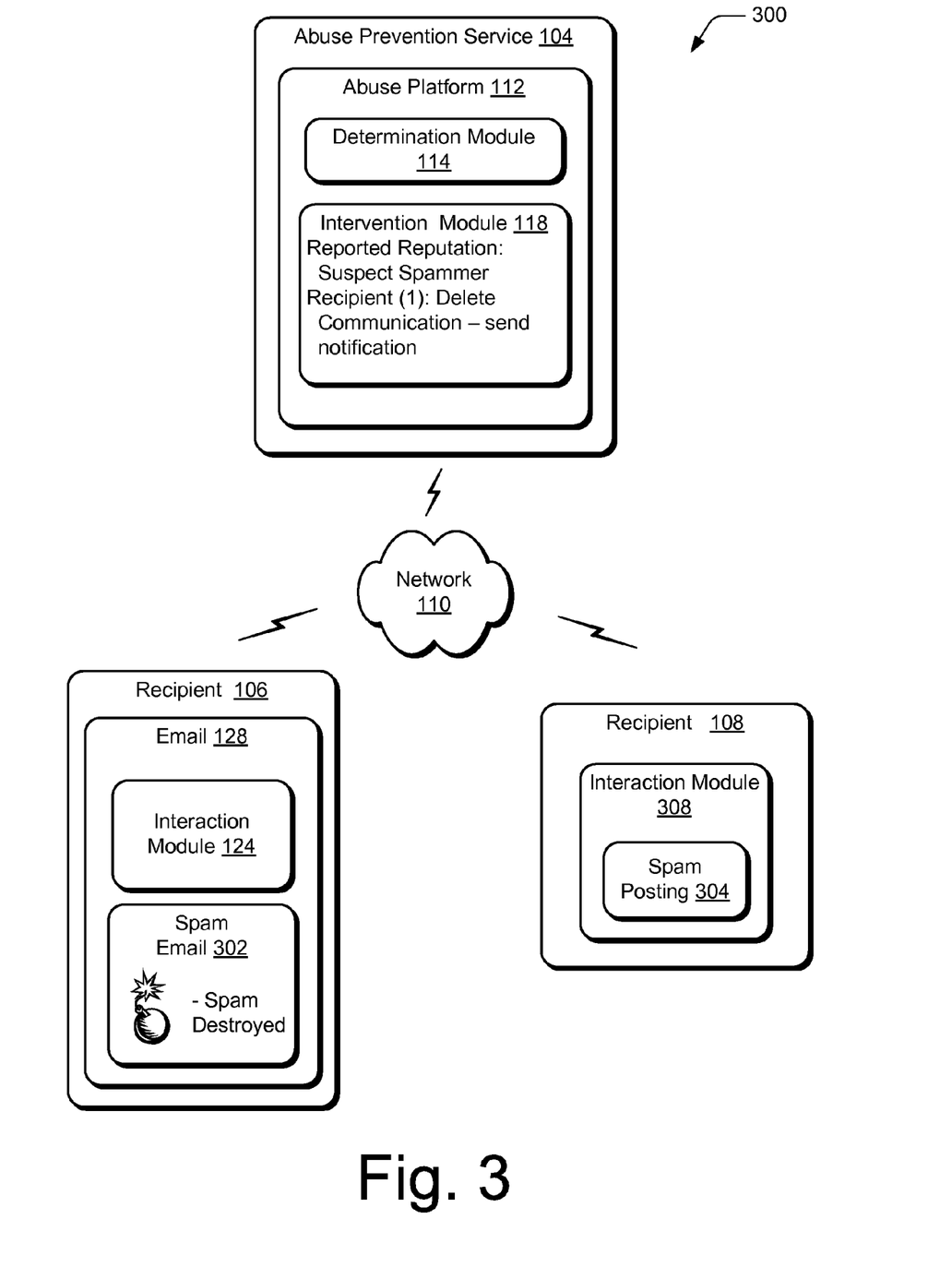
FIG. 3 is an illustration of a system in an example implementation showing an intervention module of FIG. 1 in greater detail.

FIG. 3 depicts a system 300 in an example implementation in which the intervention module 118 is shown in greater detail. By way of example for discussion purposes alone and not limitation, presume recipient 106 previously received an email 302 from a particular sender while recipient 108 reported a spam posting 304 that is associated with the particular sender. In the foregoing example, the email 302 may be delivered but, as of yet, not accessed, e.g., viewed by the recipient 106.

The determination module 114 may determine that the email 302 is to be assigned a different reputation level based on the reported spam posting 304. For example, the reputation level for the email may change because recipient 108 reported the spam posting. The recipient 108, for instance, may use an interaction module 308 to report the spam posting 304 to the abuse prevention service 104. The determination module 114 may iterate decision making for the email 302 based on the information for the particular sender, e.g., the particular sender providing the spam posting 304. In this way, the determination module 114 may make another determination when the information regarding the spam posting changes the email's reputation level (in comparison to when the email was sent). Accordingly, the intervention module 118 may inhibit access to the communication in response to the determination. For example, the intervention module 118 may hide, quarantine, or recall the communication. In another example, the intervention module 118 may restore web content to a condition that existed before the communication (e.g., the posting) changed the web content.

In other instances, instead of re-determining the communication's reputation level, the determination module 114 may automatically cause the intervention module 118 to inhibit completion of the delivery. For example, the determination module 114 may notify the intervention module 118 when a portion of the information underlying the communication's reputation level changes.

The structures, techniques, and approaches used in inhibiting access to the communication may be used in combination with the structures, techniques, and approaches discussed with respect to FIGS. 1 and 2. A variety of other examples of communication abuse prevention systems, techniques, and approaches are also contemplated, further discussion of which may be found in relation to the following procedures.

Example Procedures

The following discussion describes communication abuse prevention techniques that may be implemented utilizing the previously described systems, techniques, approaches, and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200, 300 of FIGS. 2 and 3, respectively.

Figure 4:
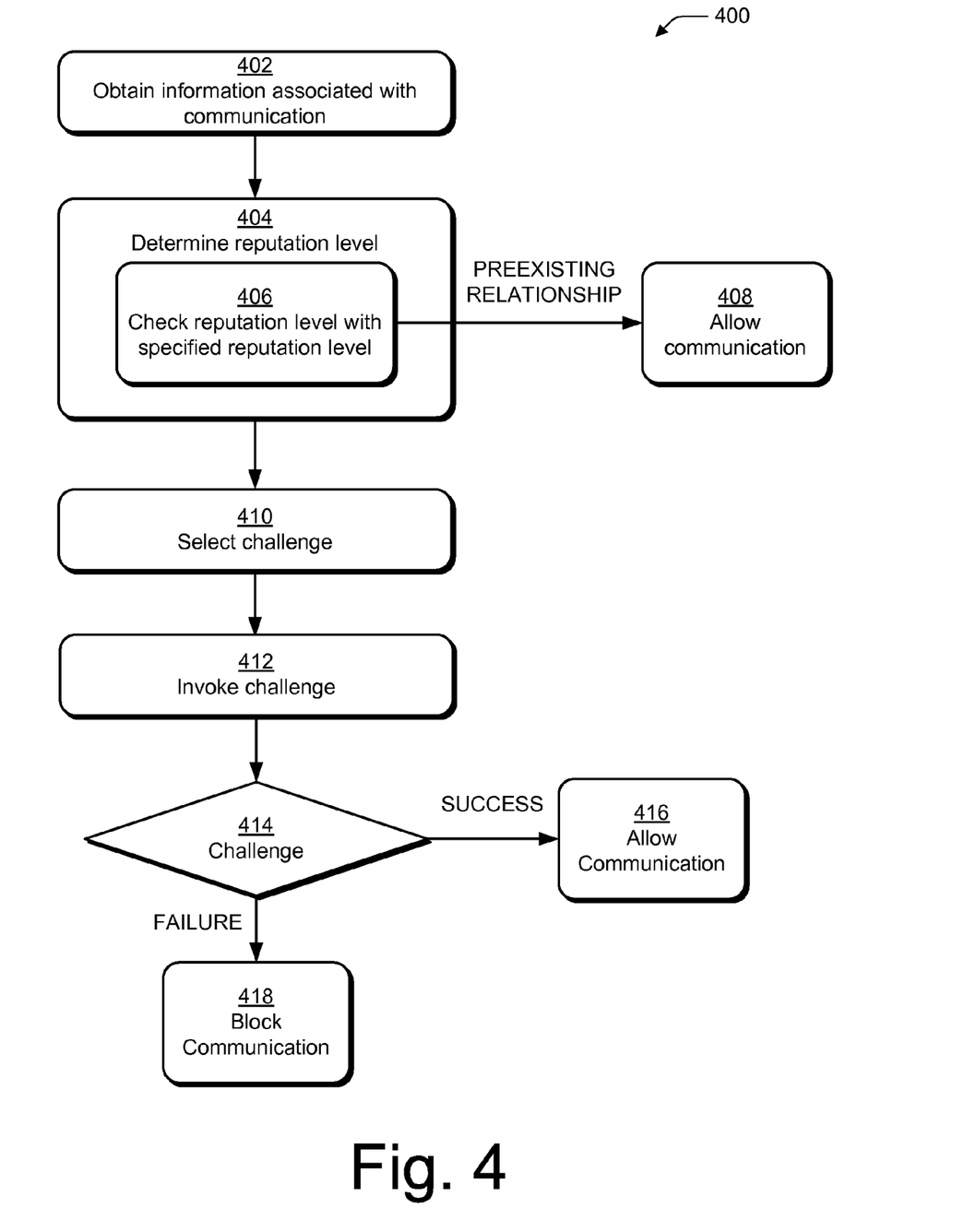
FIG. 4 is a flow diagram depicting a procedure in an example implementation that uses communication abuse prevention techniques.

FIG. 4 depicts a procedure 400 in an example implementation in which communication abuse prevention procedures are implemented. Information associated with the communication is obtained (block 402). The information may be related to one or more of the sender 102, one or more recipients 106, 108, the communication itself, and so on. Example information may include but is not limited to reputation information, e.g., a specified reputation level set by one or more of the recipients 106, 108. Additional communication information may include information related to the sender's communication behavior, feedback, and so on. Reputation information may be obtained via a variety of communication mediums. For example, feedback for a web posting by the sender 102 may be used for an email communication from the sender 102.

A reputation level is determined for the communication (block 404). The reputation level determination may be made based on the obtained information. For example, a HIP challenge may be invoked when the sender has a "poor" reputation and the recipient has designated that senders with "poor" reputations are to complete a HIP challenge before a communication is to be accepted. In the foregoing example, the communication may be blocked unless the sender 102 successfully completes the HIP challenge. A wide variety of other examples are also contemplated. For example, instead of blocking the communication in the previous example, content forming the communication may be scanned for malware, the communication may be isolated in a spam folder, and so on.

In one or more embodiments, the reputation level for the communication is checked with a specified reputation level (block 406). For example, after determining a reputation level for the communication, the reputation level may be checked with a specified reputation level for one or more of the recipients 106, 108. For the purposes of example only and not limitation, when a communication is sent to multiple recipients, whether the communication is completed may be based on successful responses to challenges that are designated for each recipient. Thus, one recipient may block the communication, while another recipient may permit the communication upon successful completion of a HIP challenge. In the previous example, the one recipient may have designated blocking, while the other recipient designated that the HIP challenge is to be successfully completed.

In further embodiments, the specified reputation level may be set for a network. For example, a social network website may specify that each sender 102 is to complete a challenge unless the sender 102 and the recipient 106 have a preexisting relationship. As noted above, the specified reputation level and/or the reputation level for the communication may be expressed numerically, weighted, adaptively calculated, and so forth.

The communication is allowed when the sender and recipient have a preexisting relationship (block 408). The sender 102 and recipient 106 may have a preexisting relationship when the sender 106 and recipient 108 are verified friends (e.g., on a friends list) or the sender and recipient have a common friend. In another example, the sender 106 and recipient 108 may have a preexisting relationship because the sender 106 and recipient 108 previously communicated, and so forth.

Which particular challenge is to be used may be selected based on the reputation level (block 410). In some embodiments, the particular challenge may also be selected based on the specified reputation level.

The particular challenge selected may be scaled based on the reputation level for the communication. Examples of scaled challenges may include using multiple tests, picking a challenge having a particular difficulty (based on a standard), picking a challenge having a particular severity (e.g., block versus scan for malware), and so on. In this manner, the complexity and/or the number of challenges that are to be completed may be scaled based on the reputation level.

The challenge is then invoked (block 412) and presented (decision block 414). For example, the challenge may be invoked by obtaining the challenge from memory and presenting the challenge to the sender via the interaction module 122 in a user interface.

The communication is allowed upon successful completion of the challenge (block 416). For example, upon successfully completion of a HIP challenge the communication may be communicated to the recipients. In contrast, the communication is blocked when the challenge is not successfully completed (block 418). In additional examples, the challenge may be a limitation imposed on the sender and/or on the communication. Examples of limitation may include scanning the content forming the communication for malware, limiting the number of recipients that may be targeted, delaying the communication, and so on. Other limitations may include limiting a number of communications that may be sent within a time period, limiting a number of recipients that may be targeted, and so on. In other instances, the communication may be blocked when the check indicates that the reputation level for the communication does not meet the specified reputation level. A variety of other examples are also contemplated without departing from the spirit and scope thereof.

Figure 5:
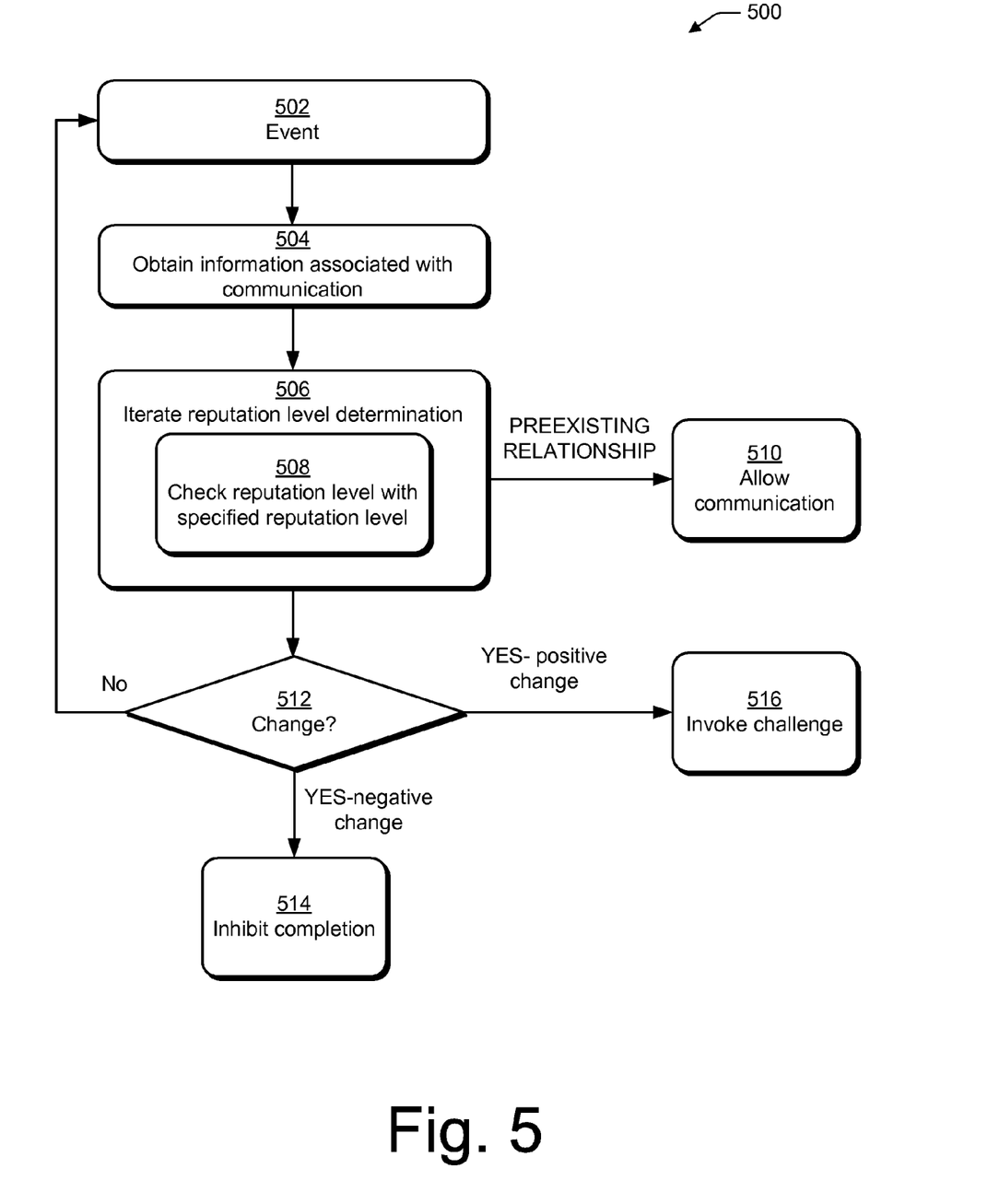
FIG. 5 is a flow diagram depicting a procedure in an example implementation that is used to inhibit access to a communication in response to a change in the communication's reputation level.

FIG. 5 depicts a procedure 500 in an example implementation in which communication inhibition techniques are implemented. The procedure 500 may be used in conjunction with the method 400. For example, the procedure 500 may be employed before the communication is accessed by the recipient.

As illustrated, in one or more embodiments, the procedure may be performed in response to an event (block 502). Sample events may include a report that a sender of the communication is associated with spam and so on. In other instances, the procedure 500 may be repeated at a specified interval until the communication is accessed by the recipient.

Information associated with the communication is obtained (block 504). The information may be current as of the event and/or the time at which the information is obtained. In instances in which the procedure is repeated in response to the event, information associated with the event (e.g., new information) may be used to update information used for a previous determination. In this way, the new information may be considered.

The determination is iterated (block 506). The determination may occur as discussed with respect to block 406. In one or more embodiments, the reputation level for the communication is checked with a specified reputation level (block 508). The check may be performed as described with respect to block 408.

The communication may be allowed when the sender and the recipient have a preexisting relationship (block 510). As noted above, the preexisting relationship may be overridden when the recipient is configured to actively block communication from the sender, e.g., the recipient no longer wishes to receive communications from the sender.

A decision is made whether a change in the communication's reputation level has occurred (decision block 512). When no change is reputation level for the communication has occurred, the procedure 500 may be repeated, e.g., no scenario is followed. The procedure 500 may be repeated based on the occurrence of an event or at a scheduled time interval. The procedure 500 may be repeated until the communication is accessed by the recipient. In other instances, the procedure 500 may be repeated unit the communication is inhibited (block 514). For example, once the communication is blocked, no further iterations may be performed.

In contrast, in some embodiments, when the decision indicates a positive change in reputation level has occurred, a challenge may be invoked (block 516). Whether a challenge is invoked may be based on the reputation level for the communication and/or as a result of the check.

In the previous example, the communication may be recalled or isolated until the challenge is successfully completed. Accordingly, completion of the communication may be inhibited or allowed based on the outcome of the "new" challenge. As is to be appreciated, the particular challenge that is invoked may correspond to the "new" reputation level. A variety of other examples are also contemplated without departing from the spirit and scope thereof.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    making an initial determination by one or more computing devices of a reputation level for a communication based on information associated with a sender of the communication;
    responsive to the initial determination, making the communication available for access;
    making a subsequent determination by one or more computing devices of the reputation level for the communication based on additional information associated with the sender of the communication; and
    responsive to the subsequent determination, inhibiting access to the communication by the one or more computing devices in which the subsequent determination indicates that the reputation level of the communication has changed from the initial determination.

2. A method as described in claim 1, wherein the inhibiting access to the communication includes performing one or more of:
    deleting the communication,
    recalling the communication,
    blocking delivery of the communication to the intended recipient,
    restoring a web content to a condition prior to the communication, or
    hiding the communication.

3. A method as described in claim 1, wherein the change in the reputation level is based on negative feedback associated with another communication from the sender.

4. A method as described in claim 1, wherein the additional information is associated with a different communication medium than that employed by the communication.

5. A method as described in claim 1, wherein the information comprises relation information.

6. A method as described in claim 1, wherein the change in reputation level is a result of negative feedback reported for another communication.

7. A computing device comprising:
one or more modules implemented at least partially in hardware, the one or more modules configured to perform operations comprising:
making an initial determination of a reputation level for a communication based on information associated with a sender of the communication;
responsive to the initial determination, making the communication available for access;
making a subsequent determination of the reputation level for the communication based on additional information associated with the sender of the communication; and
responsive to the subsequent determination, inhibiting access to the communication in which the subsequent determination indicates that the reputation level of the communication has changed from the initial determination.

8. A computing device as described in claim 7, wherein the inhibiting access to the communication includes performing one or more of:
deleting the communication,
recalling the communication,
blocking delivery of the communication to the intended recipient,
restoring a web content to a condition prior to the communication, or
hiding the communication.

9. A computing device as described in claim 7, wherein the change in the reputation level is based on negative feedback associated with another communication from the sender.

10. A computing device as described in claim 7, wherein the additional information is associated with a different communication medium than that employed by the communication.

11. A computing device as described in claim 7, wherein the information comprises relation information.

12. A computing device as described in claim 7, wherein the change in reputation level is a result of negative feedback reported for another communication.

13. A system comprising:
an abuse prevention platform implemented by one or more computing devices, the abuse prevention platform configured to perform one or more operations comprising:
making an initial determination by one or more computing devices of a reputation level for a communication based on information associated with a sender of the communication;
responsive to the initial determination, making the communication available for access;
making a subsequent determination by one or more computing devices of the reputation level for the communication based on additional information associated with the sender of the communication; and
responsive to the subsequent determination, inhibiting access to the communication by the one or more computing devices in which the subsequent determination indicates that the reputation level of the communication has changed from the initial determination.

14. The system of claim 13,
wherein the inhibiting access to the communication includes performing one or more of:
deleting the communication,
recalling the communication,
blocking delivery of the communication to the intended recipient,
restoring a web content to a condition prior to the communication, or
hiding the communication.

15. The system of claim 13, wherein the change in the reputation level is based on negative feedback associated with another communication from the sender.

16. The system of claim 13, wherein the additional information is associated with a different communication medium than that employed by the communication.

17. The system of claim 13, wherein the information comprises relation information.

18. The system of claim 13, wherein the change in reputation level is a result of negative feedback reported for another communication.

* * * * *